(12) United States Patent
Hülder et al.

(10) Patent No.: US 8,144,642 B2
(45) Date of Patent: Mar. 27, 2012

(54) METHOD FOR CONTROLLING THE SYNCHRONIZATION IN A COMMUNICATION SYSTEM COVERING AT LEAST ONE CELL FOR WIRELESS COMMUNICATION WITH A LINE-LIMITED OR ACROSS-LINE WIRELESS DIRECT COMMUNICATION POSSIBILITY BETWEEN MOBILE PARTS THAT IS SYNCHRONIZED WITH A BASE STATION

(75) Inventors: Stefan Hülder, Deuten (DE); Dieter Kehren, Dinslaken (DE); Christoph Lenfort, Bocholt (DE)

(73) Assignee: Gigaset Communications GmbH, Munich (DE)

( * ) Notice: Subject to any disclaimer, the term of this patent is extended or adjusted under 35 U.S.C. 154(b) by 195 days.

(21) Appl. No.: 12/525,245

(22) PCT Filed: Jan. 29, 2008

(86) PCT No.: PCT/EP2008/050990
§ 371 (c)(1), (2), (4) Date: Feb. 1, 2010

(87) PCT Pub. No.: WO2008/092834
PCT Pub. Date: Aug. 7, 2008

(65) Prior Publication Data
US 2010/0130190 A1  May 27, 2010

(30) Foreign Application Priority Data
Feb. 1, 2007 (EP) .................................. 07002213

(51) Int. Cl.
*H04J 1/16* (2006.01)
*H04L 12/56* (2006.01)

(52) U.S. Cl. .................... 370/315; 370/329; 370/252
(58) Field of Classification Search .................. 370/329, 370/328, 315, 252
See application file for complete search history.

(56) References Cited

U.S. PATENT DOCUMENTS
2006/0003772 A1* 1/2006 Semper .................... 455/452.1
2007/0121531 A1* 5/2007 Lee et al. .................. 370/280

FOREIGN PATENT DOCUMENTS
DE    19903018       7/2000
EP    0 777 344 A2   6/1997
WO    WO 2007/003616 A1   1/2007

OTHER PUBLICATIONS
PCT International Search Report, PCT Application No. PCT/EP2008/050990, Apr. 15, 2008, 4 pages.

* cited by examiner

*Primary Examiner* — John Pezzlo
(74) *Attorney, Agent, or Firm* — Fenwick & West LLP (57) ABSTRACT

In order to prevent in a communication system covering at least one cell for wireless communication, the system having a line-limited or across-line wireless direct communication possibility between mobile phones that is synchronized with a base station, that mobile parts attempt to synchronize in the communication system with a continuous broadcast downlink service provided by a hybrid mobile part, it is proposed to mark the continuous broadcast downlink service of the hybrid mobile part, which assumes the role of a radio fixed part, so that mobile parts, which want to synchronize with a true radio fixed part, can detect that the service provided by the hybrid mobile part is not permanently available, or even incomplete.

5 Claims, 6 Drawing Sheets

METHOD FOR CONTROLLING THE SYNCHRONIZATION IN A COMMUNICATION SYSTEM COVERING AT LEAST ONE CELL FOR WIRELESS COMMUNICATION WITH A LINE-LIMITED OR ACROSS-LINE WIRELESS DIRECT COMMUNICATION POSSIBILITY BETWEEN MOBILE PARTS THAT IS SYNCHRONIZED WITH A BASE STATION

This application is the National Stage of and claims priority to International Application No. PCT/EP2008/050990, filed Jan. 29, 2008, and claims the benefit of European Application No. 07002213.2, filed Feb. 1, 2007, both of which are incorporated by reference in their entirety.

FIELD OF THE INVENTION

This invention relates to a method for controlling synchronization in a communication system covering at least one cell for wireless communication with cell-limited and/or cross-cell wireless direct communications between mobile components synchronized with a base station.

BACKGROUND OF THE INVENTION

FIGS. 1 to 4 illustrate the functioning of the prior art method for controlling synchronization in a communication system covering at least one cell for wireless communication, preferably a DECT system (Digital Enhanced Cordless Telecommunication), with cell-limited and/or cross-cell wireless direct communication (DECT Distributed Communication, DDC) synchronized with a base station between mobile components. In this connection the specification will refer to relevant sections of the DECT Standard, ETSI Publication EN 300 175-1 . . . 8, November 2004, in dealing with the question of distributed communication in accordance with the DECT standard.

BRIEF DESCRIPTION OF THE DRAWINGS

Figure 1:
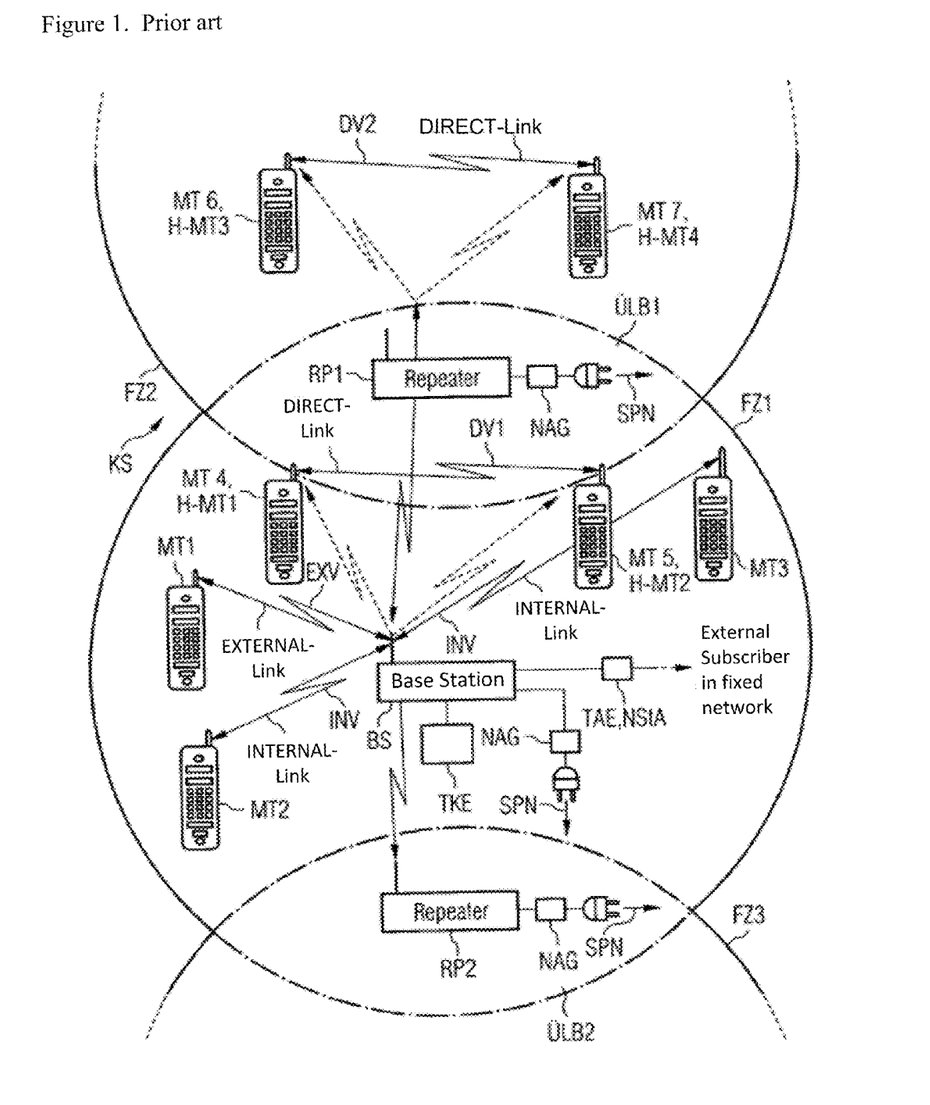
FIG. 1: a DECT-based multicell communication system.

FIG. 1 shows a multicell-based (a so-called CMI-based (Cordless Multicell Integration)) DECT communication system KS, in which a "single cell"-based DECT system for the home area in accordance with the DECT Standard has been expanded with the addition of an intermediate, or relay, station, the so-called repeater (Cordless Radio Fixed Part, CRFP), into a CMI-based DECT system. The multicell communication system KS features a first cell FZ1, which functions as radio service area for a DECT base station BS (Radio Fixed Part, RFP), and in which, in addition to the base station BS, there are five mobile components MT1-MT5 (Portable Part, PP), all radio-linked to the base station BS. The base station BS, which for power supply is connected to a voltage network SPN via a network connector NAG, is linked to the fixed network by either a telecommunications connector TAE or a private automatic branch exchange NStA. The base station BS will also be connected to a telecommunication terminal device TKE, preferably an electric bell system, fax machine, personal computer etc.

Of the five mobile components MT1-MT5, a first mobile component MT1 maintains EXTERN communication EXV via the base station BS with an external subscriber in the fixed network, while a second mobile component MT2 and a third mobile component MT3 each maintain INTERNAL communication INV with the base station BS for intrasystem communications. In addition to this INTERNAL communication INV between the second mobile component MT2 and the third mobile component MT3, in the first cell FZ1 of the communication system KS will also be a first DIRECT communication DV1 between a fourth mobile component MT4 and a fifth mobile component MT5.

Because of this additional direct communication capability between the fourth mobile component MT4 and the fifth mobile component MT5 (distributed communication), when referring to the communication system under the terms of the DECT standard (cf. EN 300 175-5, V1.8.1, November 2004, Annex 1) one speaks of a "distributed communication DECT local network (DCDL-Net)." The subscribers of a "distributed communication DECT local network," who can establish DIRECT connections, are referred to as "members" and must also have both "portable termination (PT)" and "fixed termination (FT)" capabilities. For this reason they are also referred to as hybrid mobile components, so that the fourth mobile component MT4 will also be a first hybrid mobile component H-MT1, while the fifth mobile component MT5 will be a second hybrid mobile component H-MT2. Basically, the role of "master" in the "distributed communication DECT local network" can be assumed by any "DCDL Net" terminal, or "member." Although, because this will be self-evident, this role would preferably be played by the base station of the "distributed communication DECT local network."

In expanding from a "single-cell" system to a "multicell" system, in addition to the first cell FZ1, the communication system KS will have two more cells, a second cell FZ2 and a third cell FZ3. In a first overlap area UeLB1 between the first cell FZ1 and the second cell FZ2 and in a second overlap area UeLB2 between the first cell FZ1 and the third cell FZ3 will be repeaters performing the functions of relay or intermediate stations, a first repeater RP1 in the first overlap area UeLB1 and a second repeater RP2 in the second overlap area UeLB2. As "members" of the communication system KS, both repeaters RP1 and RP2, as well as the base station BS functioning as "master" in the first cell, are connected via a network connector NAG to a voltage network SPN. The first repeater RP1 is radio-linked with two more mobile components, a sixth mobile component MT6 and a seventh mobile component MT7, which are both located outside the first cell FZ1 in the second cell FZ2. Between the sixth mobile component MT6 and the seventh mobile component MT7 there is a second DIRECT communication link DV2, for which reason the sixth mobile component MT6 is referred to as the third hybrid mobile component H-MT3, the seventh mobile component MT7 as the fourth hybrid mobile component H-MT4.

Figure 2:
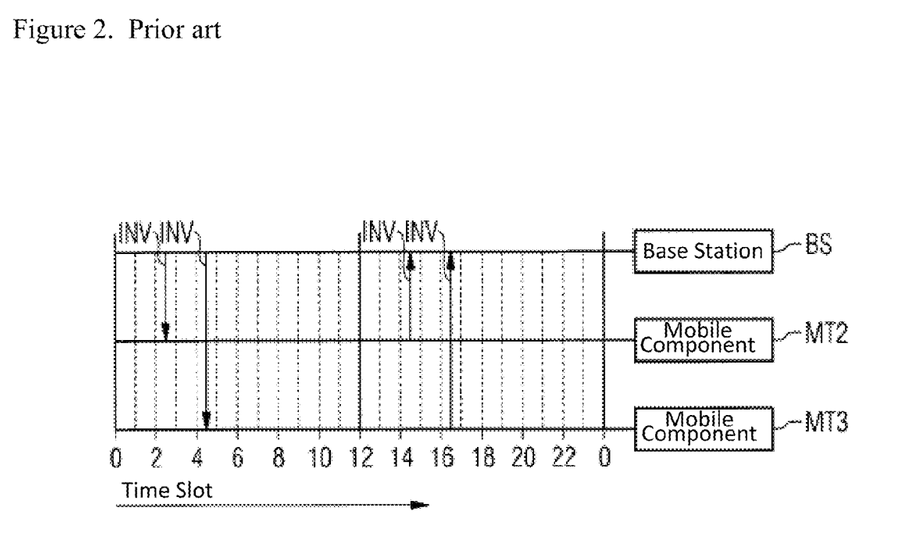
FIG. 2: time slot configuration in conventional INTERNAL communications in the DECT-based multicell communication system.

FIG. 2 shows how in the INTERNAL communication system INV, the conventional communication capability between two mobile components, here, e.g., the second mobile component MT2 and the third mobile component MT3, the "time" resource is allocated in the DECT-based multicell communication system (time-slot configuration).

As a rule, internal communications in DECT-based communication systems are handled such that both subscribers, or both mobile components respectively, are linked to the base station, which combines the two data streams. Since for INTERNAL communications the base station allocates more (twice as much) bandwidth than is really required for user data transmission, while at the same time the bandwidth available to the base station is limited, to establish an INTERNAL communication capability proves to be particularly disadvantageous if internal communications with greater data traffic volumes are to be established.

To establish INTERNAL communications INV between the mobile components MT2, MT3 in the communication system KS in accordance with FIG. 1, the following time slots will be allocated, for example, in accordance with FIG. 2: For communication (duplex communication) between the base station BS and the second mobile component MT2 time slots "2" and "14" are used, while for communication (duplex communication) between the base station BS and the third mobile component MT3 time slots "4" and "16" are allocated.

Figure 3:
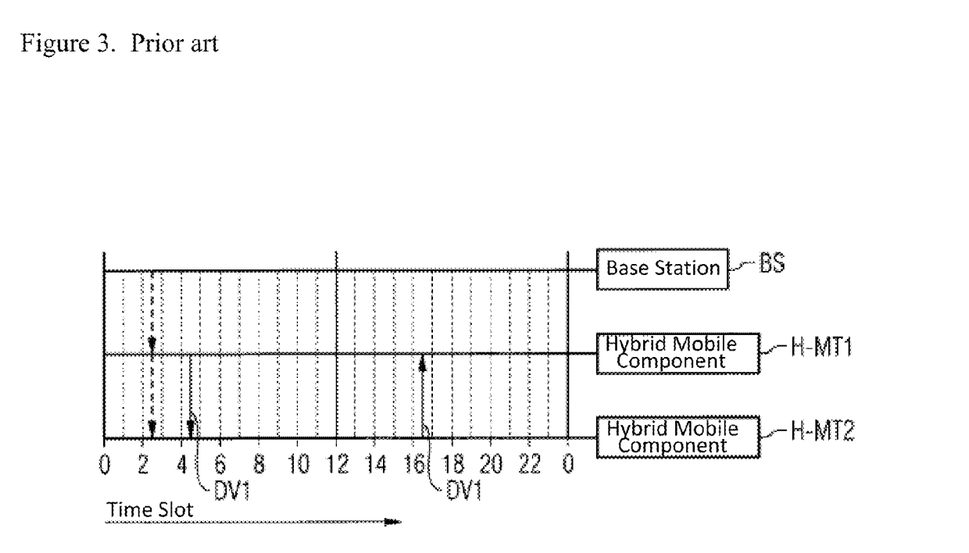
FIG. 3: time slot configuration in DDC communications in the DECT-based multicell communication system.

FIG. 3 shows how the "time" resource is allocated (time slot allocation) in the case of DIRECT communications (distributed communications) DV1, DV2, as direct, proximate communications between two hybrid mobile components, here, e.g., the first mobile component H-MT1 and the second mobile component H-MT2, or the third mobile component H-MT3 and the fourth mobile component H-MT4, in the DECT-based multicell communication system KS.

To establish a "distributed communication" capability, at least the hybrid mobile component to be called must enable an "idle receiver scanning" per "bearer request messages" as described in the DECT standard for base stations (cf. EN 300 175-3, Section 11.8, November 2004).

Since this "idle receiver scanning" is highly energy-intensive, hybrid mobile components will as a rule not activate the "idle receiver scanning" on a permanent basis. In one obvious embodiment, a hybrid mobile component to be called will activate an "idle receiver scanning" only upon request by other means. The DECT standard provides an "indirect link establishment" procedure for this (cf. EN 300 175-5, Section I.3.8, November 2004).

Alternatively, a conventional internal link can also be used to introduce a "distributed communication" capability or activate "idle receiver scanning" for the hybrid mobile component to be called. This alternative has to date been the preferred implementation for GIGASET cordless telephones to minimize modification/update requirements and preparatory procedures for the telephone base station.

Connections can then also be established for a "distributed communication" system by implementing the familiar rules for "connection- and bearer-setup" as described in the DECT standard (cf. EN 300 175-3, Chapters 10.2 and 10.5, November 2004). Under these procedures, the calling hybrid mobile component functions as a conventional mobile component (portable part), the called hybrid mobile component as a base station (radio fixed part).

The time slot configuration for the first DIRECT connection DV1 between the first mobile component H-MT1 and the second mobile component H-MT2 in the communication system KS according to FIG. 1 is implemented in the preceding embodiments per FIG. 2, e.g., in the following manner:

To transmit "bearer request messages" from the base station BS to the first hybrid mobile component H-MT1 and/or to the second hybrid mobile component H-MT2 time slot "2" is used, while time slots "4" and "16" are allocated for "connection- and bearer-setup" for the DIRECT link DV1 between the first hybrid mobile component H-MT1 and the second hybrid mobile component H-MT2.

Although not shown in FIG. 2, the time slot configuration for the second DIRECT link DV2 between the third mobile component H-MT3 and the fourth mobile component H-MT4 in the communication system KS per FIG. 1 is essentially analogous, whereby in this case the "master" is not the base station BS, but the first repeater RP1.

Figure 4:
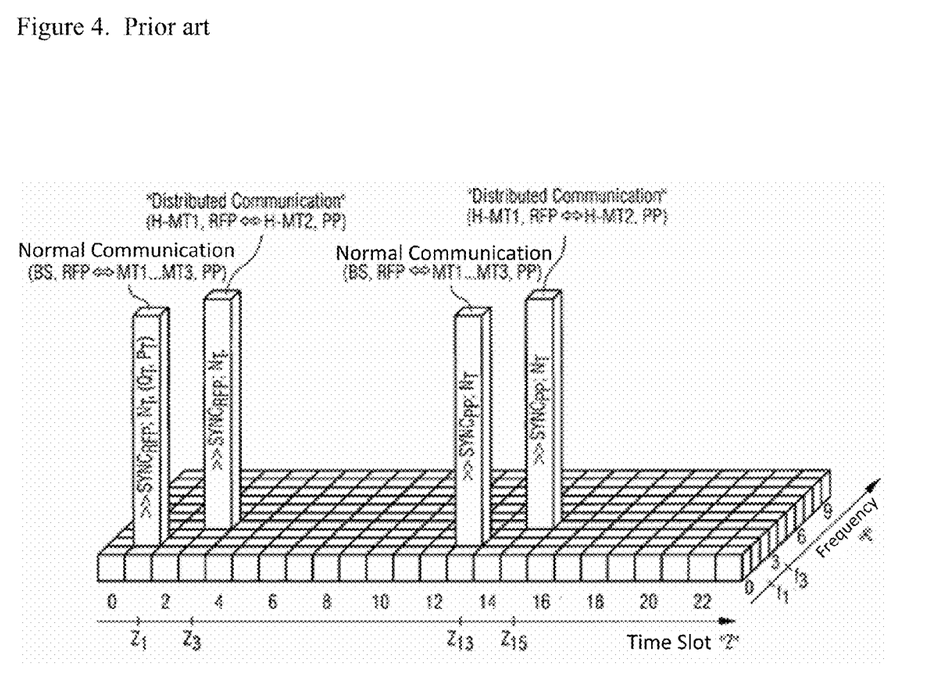

FIG. 4 is a diagram of the prior art synchronization control in the DECT-based multicell communication system KS per FIG. 1. A detailed description of this synchronization control will be introduced here by a few general observations on synchronization control as related to "distributed communication" with reference to the DECT standard.

The "medium access control (MAC) layer" procedures for "distributed communication" are not described in the ETSI publication EN 300 175. But for active "distributed communications," the hybrid mobile component, which has assumed the role of the base station as a "fixed termination (FT)," in the A field must also maintain the time-division multiplexing for A-field messages (T-MUX messages) of a "radio fixed part, RFP" as described in EN 300 175-3, Chapter 6.2.2.1.1. Unanswered, however, is the question of which broadcast channels ($N_T$, $P_T$, $Q_T$) this hybrid mobile component will serve. The hybrid mobile component assuming the role of the "radio fixed part" will definitely have to serve the $N_T$ channel to perform a "radio fixed part identity (RFPI)" handshake in accordance with EN 300 175-3, Chapter 11.5.1. On the other hand, the $Q_T$ and $P_T$ channels are not absolutely essential.

So for "distributed communications" the hybrid mobile component playing the role of the "radio fixed part" provides a "continuous downlink broadcast service" in accordance with EN 300 175-3, Chapter 5.7.1.1, which, however, remains incomplete if channels $Q_T$ or $P_T$ are not served. But it is at least provided that the mobile components can pick up $N_T$ messages and thereby attempt to synchronize with this "continuous broadcast downlink service." If, however, the $Q_T$ channel is not transmitted, all attempts by a mobile component to synchronize will fail because it would wait to no avail for $Q_T$ messages required for synchronization.

DECT Standard EN 300 175-5, Chapter I.2.1 and Chapter I.2.3, also specifies that the "master" of a "distributed communication DECT local network (DCDL net)" is responsible for permanently providing a "connectionless bearer service," which makes the "continuous broadcast downlink service" available, so as to provide an "intranetwork" synchronization. For this reason, there is no need for idle hybrid mobile components to provide their own "continuous broadcast service," so they can limit themselves to listening to the "connectionless bearer service" of the "master."

On the other hand, this can lead to a situation in which, during "distributed communications," active hybrid mobile components will be providing a "continuous broadcast service," with which mobile components could be attempting without success to synchronize.

Nowhere does DECT Standard EN 300 175 offer any solutions for this problem relating to "DECT distributed communication," and no implementations having the object of solving it are known in practice.

The diagram in FIG. 4 shows how, for the scanning mobile components MT1-MT5 in the first cell FZ1 of the multicell communication system KS per FIG. 1, which are all searching for a signal from the base station BS, mobile components MT1-MT3 basically are synchronized with the base station BS. The DECT spectrum available here consists of 24 time slots $Z_0$-$Z_{23}$ in TDD mode (e.g., time slots $Z_0$-$Z_{11}$ for the downlink, time slots $Z_{12}$-$Z_{23}$ for the uplink) and 10 frequencies $f_0$-$f_9$, where the height of a bar in the diagram corresponds to the strength of the signal in a particular time slot and at a particular frequency. The label on the bars characterizes properties essential to the known synchronization control and contents associated with the transmission.

So for example, at frequency $f_1$ of frequencies $f_0$-$f_9$ in time slots $Z_1$ and $Z_{13}$ of time slots $Z_0$-$Z_{23}$ there will be a normal link between the base station BS (radio fixed part) and the mobile component MT1-MT3 (portable part), while at frequency $f_3$ of frequencies $f_0$-$f_9$ in time slots $Z_3$ and $Z_{15}$ of time slots $Z_0$-$Z_{23}$ there is "distributed communication" between the first hybrid mobile component H-MT1 and the second hybrid mobile component H-MT2. In the "distributed communication" between the first hybrid mobile component H-MT1 and the second hybrid mobile component H-MT2, the first hybrid mobile component H-MT1 is assigned the role of the "radio fixed part," i.e., the role of "master, while the second hybrid mobile component H-MT2 is assigned the role of a "portable part," i.e., the role of a "member."

In the preliminary phase of the normal communication between the base station BS and the mobile component MT1-MT3, in which the base station BS transmits $N_T$ messages containing $N_T$ data packets in accordance with the DECT standard, and, as required (as referred to above), $Q_T$ messages containing $Q_T$ packets per DECT standard and/or $P_T$ messages containing $P_T$ data packets, the mobile component MT1-MT3 searches for the $N_T$ messages of the base station BS containing the $N_T$ data packets. But the $N_T$ messages containing the $N_T$ data packets transmitted by the base station BS in time slot $Z_1$ at frequency $f_1$ cannot be distinguished from the $N_T$ messages containing $N_T$ data packets transmitted by the first hybrid mobile component H-MT1, slipping into the role of the "radio fixed part," i.e., the role of "master," in time slot $Z_3$ at frequency $f_3$. Of course the aforementioned "radio fixed part identity (RFPI)" values, transmitted during the RFPI handshake, of the base station BS and the first hybrid mobile component H-MT1 in the $N_T$ data packets of the $N_T$ messages can be distinguished. The discrimination criterion involved here, however, says nothing about whether this is a true "radio fixed part," i.e., a base station, or a hybrid mobile component simply playing the role of a "radio fixed part" in a "distributed communication" and therefore not a true "radio fixed part."

So it cannot be excluded that for synchronization with a "radio fixed part" the searching mobile component MT1-MT3 will select the signal with $N_T$ messages transmitted in time slot $Z_3$ at frequency $f_3$ and consequently attempt to synchronize with this signal. But since the $N_T$ messages transmitted in time slot $Z_3$ at frequency $f_3$ have been transmitted by a spurious "radio fixed part" which will transmit no further messages, the mobile component MT1-MT3 will wait to no avail for a $Q_T$ message containing the required synchronization data. Synchronization with the "radio fixed part" will therefore have failed. As a consequence, in the "best case," the wait for the $Q_T$ messages in the mobile component MT1-MT3 is limited in time, and the synchronization procedure would be resumed with another suitable signal, while in the "worst case" the mobile component waits indefinitely for the $Q_T$ messages and so remains unusable.

SUMMARY OF INVENTION

The objective underlying the present invention is to offer a method for controlling synchronization in a communication system covering at least one cell for wireless communication with cell-limited and/or cross-cell wireless direct communications between mobile components synchronized with a base station such as to prevent mobile components in the communication system from attempting to synchronize with a continuous broadcast downlink service provided by a hybrid mobile component.

The idea constituting the basis of the invention described here consists in that, in a communication system covering at least one cell for wireless communication with cell-limited and/or cross-cell wireless direct communications between mobile components synchronized with a base station, a "continuous broadcast downlink service" of a hybrid mobile component slipping into the role of a "radio fixed part" would be identified in such a way as to enable mobile components attempting to synchronize with a true "radio fixed part" to recognize that the service provided by the hybrid mobile component is either not available continuously or is only a partial service.

For a DECT communication system this can in particular be achieved in a variety of ways.

One alternative consists in that the "continuous broadcast downlink service" of the hybrid mobile component also transmits a valid, as yet undefined, $P_T$ or $Q_T$ message indicating that this "continuous broadcast downlink service" originates from a hybrid mobile component in an active "distributed communication," that it is either not available continuously or is only a partial service, and so therefore should not be used by mobile components for synchronization either.

A second alternative consists in that a differentiation, or discrimination, feature has been created in the synchronization field of a DECT packet (burst). According to ETSI Publication EN 300 175-2, Chapter 4.6, the DECT packets contain an initial so-called synchronization field. There are two bit patterns for this synchronization field: one pattern for packets from "portable parts" and a second pattern for packets from "radio fixed parts." The conventional "continuous broadcast downlink service" of a base station will be transmitted in packets containing the synchronization word for RFP-based transmissions. On the other hand, however, it becomes possible to distinguish packets transmitted by hybrid mobile components in an active "distributed communication" in the role of the "radio fixed part" if they contain either the synchronization word for PP-based transmissions or a still undefined third synchronization word.

It is particularly useful to use the synchronization word for PP-based transmissions for hybrid mobile components in the RFP role of a "distributed communication" as well because available integrated circuits, referred to as ICs, may support synchronization for only the two known synchronization patterns (for the "portable part" and for the "portable part" [sic]). Also useful here is the fact that mobile components of older product generations need not support any new "messages" or procedures required to select a valid "continuous broadcast downlink service" and distinguish packets of hybrid mobile components in the RFP role.

Furthermore, this type of identification, or marking, of the packets of a hybrid mobile component active in a "distributed communication" will also be recognized in every packet transmitted. This is especially useful because in synchronized multicell systems, there are scanning procedures (multicell search) for mobile components searching for a base station best suited for the establishment of a link which captures only individual $N_T$ packets. According to the DECT standard, the $N_T$ message contents can include no other information. Encryption in still undefined $P_T$ or $Q_T$ messages would be possible, but in the case of multicell searching it may not be captured. This technique makes it possible to mark the "continuous broadcast downlink service" of hybrid mobile components for synchronous RFP scanning of mobile components in multicell systems ("multicell search").

FIGS. 1-4 show:

FIG. 4: a diagram illustrating synchronization control according to the prior art in the DECT-based multicell communication system in accordance with FIG. 1, in which a normal DECT communication ["Radio Fixed Part" (RFP)—

Portable Part (PP)] is compared with a "distributed communication" [Hybrid Part (HyP—Hybrid Part (HyP)].

Two exemplary embodiments of the present invention are illustrated on the basis of FIGS. 5 and 6. They show:

DETAILED DESCRIPTION OF THE INVENTION

Figure 5:
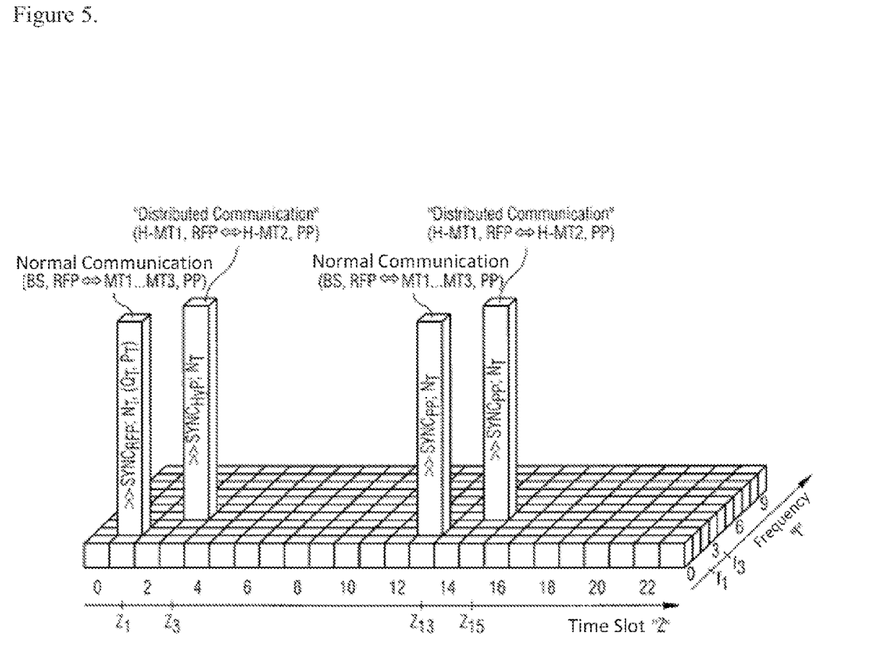
FIGS. 5 and 6 are diagrams of the synchronization control according to the invention in the DECT-based multicell communication system in accordance with FIG. 1.

FIG. 5 shows one embodiment of the synchronization control in the DECT-based multicell communication system per FIG. 1, in which a normal DECT link ["radio fixed part" (RFP)↔"portable part" (PP)] is compared with a "distributed communication" ["hybrid part" (HyP)↔"hybrid part" (HyP)].

To begin with, as in FIG. 4, the diagram in FIG. 5 once again shows basically how, from the perspective of the scanning mobile components MT1-MT5 in the first cell FZ1 of the multicell communication system KS per FIG. 1, which are all searching for a signal from the base station BS, mobile components MT1-MT3 are synchronized with the base station BS. The available DECT spectrum consists of 24 time slots $Z_0$-$Z_{23}$ in TDD mode (e.g., time slots $Z_0$-$Z_{11}$ for the downlink, time slots $Z_{12}$-$Z_{23}$ for the uplink) and 10 frequencies $f_0$-$f_9$, the height of a bar in the diagram corresponding to the strength of the signal in a particular time slot and at a particular frequency. The label on the bar characterizes the properties essential to the known synchronization control and contents associated with the transmission.

So for example at frequency $f_1$ of frequencies $f_0$-$f_9$ in time slots $Z_1$ and $Z_{13}$ of time slots $Z_0$-$Z_{23}$ there is a normal link between the base station BS (radio fixed part) and the mobile component MT1-MT3 (portable part), while at frequency $f_3$ of frequencies $f_0$-$f_9$ in time slots $Z_3$ and $Z_{15}$ of time slots $Z_0$-$Z_{23}$ there is a "distributed communication" between the first hybrid mobile component H-MT1 and the second hybrid mobile component H-MT2. In the "distributed communication" between the first hybrid mobile component H-MT1 and the second hybrid mobile component H-MT2, the first hybrid mobile component H-MT1 is assigned the role of the "radio fixed part," i.e., the role of "master," and the second hybrid mobile component H-MT2 the role of a "portable part," i.e., the role of a "member."

In the preparatory phase of the normal communication between the base station BS and the mobile component MT1-MT3, in which the base station BS transmits $N_T$ messages containing $N_T$ data packets in accordance with the DECT standard and, as required, as has been described above, $Q_T$ messages containing $Q_T$ data packets per the DECT standard and/or $P_T$ messages containing $P_T$ data packets per the DECT standard, the mobile component MT1-MT3 searches for the $N_T$ messages of the base station BS containing the $N_T$ data packets. The $N_T$ messages with the $N_T$ data packets transmitted by the base station BS in time slot $Z_1$ on frequency $f_1$ now differ in the synchronization field, however, from the $N_T$ messages with $N_T$ data packets transmitted by the first hybrid mobile component H-MT1, which has slipped into the role of the "radio fixed part," i.e., the role of "master," in time slot $Z_3$ on frequency $f_3$. So the base station BS sends a synchronization word $SYNC_{RFP}$, and the first hybrid mobile component H-MT1 sends a synchronization word $SYNC_{HyP}$.

In accordance with ETSI Publication EN 300 175-2, Chapter 4.6, DECT data packets begin with a so-called synchronization field consisting of a preamble and a synchronization word. There are two bit patterns for this synchronization field: one pattern for packets from "portable parts" and a second pattern for packets from "radio fixed parts."

From this can now be derived a first approach to the problem of how in "distributed communication" the synchronization word $SYNC_{RFP}$ can be distinguished from the synchronization word $SYNC_{HyP}$. In the conventional "continuous broadcast downlink service," for example, the base station BS transmits data packets which contain the synchronization word for RFP-based transmissions, the synchronization word $SYNC_{RFP}$. On the other hand, the data packets transmitted by the first hybrid mobile component H-MT1 in an active "distributed communication" in the role of the "radio fixed part" can be distinguished if these packets contain the synchronization word for PP-based transmissions, i.e., the synchronization word $SYNC_{HyP}$.

In a second approach, it could be that the synchronization word $SYNC_{HyP}$ will not be the synchronization word for PP-based transmissions, but rather that for this purpose in the DECT standard, in addition to the synchronization words for RFP- and PP-based transmissions, another, third, synchronization word will be defined.

So if the base station BS transmits the synchronization word $SYNC_{RFP}$ and the first hybrid mobile component H-MT1 the synchronization word $SYNC_{HyP}$ in accordance with the two approaches described above, the scanning mobile component MT1-MT3 will not select the signal transmitted in time slot $Z_3$ on frequency $f_3$ for synchronization.

Figure 6:
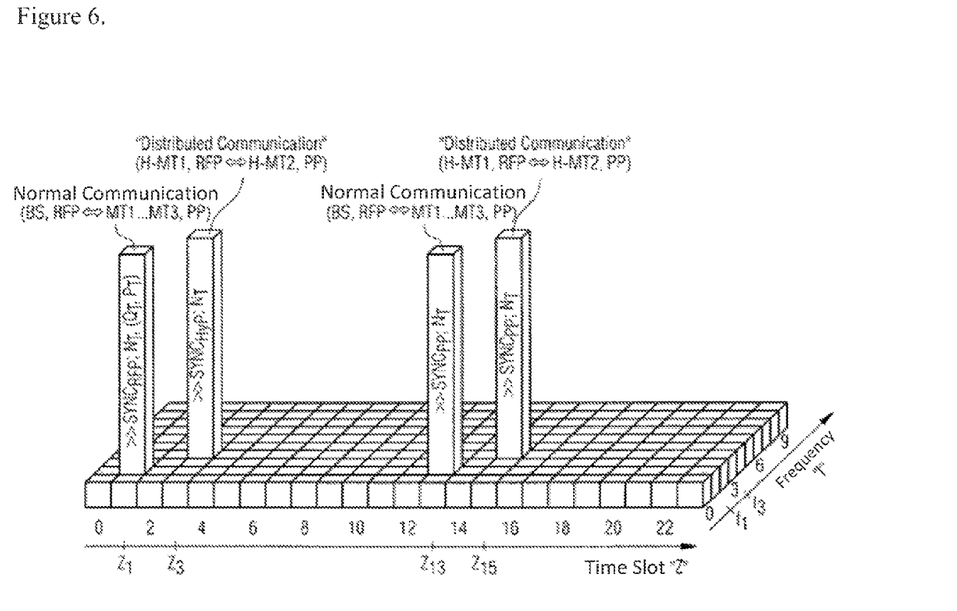

FIG. 6 shows another embodiment of the synchronization control scheme in the DECT-based multicell communication system per FIG. 1, in which a normal DECT link ["radio fixed part" (RFP)↔"portable part" (PP)] is compared with a "distributed communication" ["hybrid part" (HyP)↔"hybrid part" (HyP)].

To begin with, the diagram in FIG. 6 once again, as in FIG. 4, shows basically how, from the perspective of the scanning mobile components MT1-MT5 in the first cell FZ1 of the multicell communication system KS per FIG. 1, which are all searching for a signal from the base station BS, mobile components MT1-MT3 synchronize with the base station BS. The available DECT spectrum consists of 24 time slots $Z_0$-$Z_{23}$ in TDD mode (e.g., time slots $Z_0$-$Z_{11}$ for the downlink, time slots $Z_{12}$-$Z_{23}$ for the uplink) and 10 frequencies $f_0$-$f_9$, the height of a bar in the diagram corresponding to the strength of the signal in a particular time slot and at a particular frequency. The label on the bar characterizes the properties essential to the known synchronization control and contents associated with the transmission.

So for example at frequency $f_1$ of frequencies $f_0$-$f_9$ in time slots $Z_1$ and $Z_{13}$ of time slots $Z_0$-$Z_{23}$ there is a normal link between the base station BS (radio fixed part) and the mobile component MT1-MT3 (portable part), while at frequency $f_3$ of frequencies $f_0$-$f_9$ in time slots $Z_3$ and $Z_{15}$ of time slots $Z_0$-$Z_{23}$ there is a "distributed communication" between the first hybrid mobile component H-MT1 and the second hybrid mobile component H-MT2. In the "distributed communication" between the first hybrid mobile component H-MT1 and the second hybrid mobile component H-MT2, the first hybrid mobile component H-MT1 is assigned the role of the "radio fixed part," i.e., the role of "master," the second hybrid mobile component H-MT2 the role of a "portable part," i.e., the role of a "member."

In the preparatory phase of the normal communication between the base station BS and the mobile component MT1-MT3, in which the base station BS transmits $N_T$ messages containing $N_T$ data packets in accordance with the DECT standard and, if required, as described above, $Q_T$ messages containing $Q_T$ data packets per the DECT standard and/or $P_T$ messages containing $P_T$ data packets per the DECT standard, the mobile component MT1-MT3 searches for the $N_T$ messages of the base station BS containing the $N_T$ data packets. The $N_T$ messages with the $N_T$ data packets transmitted by the base station BS in time slot $Z_1$ on frequency $f_1$ will not, as in FIG. 4, differ from the $N_T$ messages with $N_T$ data packets transmitted by the first hybrid mobile component H-MT1, which slips into the role of the "radio fixed part," i.e., the role of "master," in time slot $Z_3$ on frequency $f_3$.

But according to the diagram, in time slot $Z_3$ on frequency $f_3$ the first hybrid mobile component H-MT1 transmits not only $N_T$ messages with the $N_T$ data packets, but also $Q_T$ messages with the $Q_T$ data packets and/or $P_T$ messages with the $P_T$ data packets. So in an appropriate $Q_T$ or $P_T$ message it becomes possible to encrypt the information that this signal originates not from the base station BS, but rather from the first hybrid mobile component H-MT1 in the role of the "radio fixed part" in the "distributed communication." On the other hand, the scanning mobile component MT1-MT3 can in fact select the signal transmitted in time slot $Z_3$ at frequency $f_3$ to synchronize with here, too. But it will be during the synchronization procedure that the $Q_T$ or $P_T$ message is received that indicates whether this is the signal of the first hybrid mobile component H-MT1 and not the base station BS. So the search will then begin for another signal for synchronization.

What is claimed is:

1. Method for controlling synchronization in a communication system (KS) covering at least one cell (FZ1, FZ2, FZ3) for wireless communication with cell-limited and/or cross-cell wireless direct communications (DV1, DV2) between mobile components (H-MT1, H-MT2, H-MT3, H-MT4) synchronized with a base station (BS) characterized in that during direction communications between the mobile components (H-MT1, H-MT2, H-MT3, H-MT4), a first mobile component (H-MT1, H-MT3), which at least temporarily assumes a "radio fixed part" function of the base station (BS), provides a "continuous broadcast downlink service" and, by virtue of special information included in the transmission, identifies itself as a hybrid mobile component, so that mobile components (MT1-MT3, MT7) trying directly or indirectly through a repeater (RP1) to synchronize with the base station (BS) can tell that the service provided by the hybrid mobile component (H-MT1, H-MT3) either is not continuously available or is only a partial service.

2. Method according to claim 1 characterized in that the communication system (KS) is a DECT communication system, and the base station (BS) functions as a DECT base station, the mobile components (MT1-MT7, H-MT1-H-MT4) function as DECT mobile components, and the repeaters (RP1, RP2) function as DECT repeaters in accordance with the DECT protocol.

3. Method according to claim 2 characterized in that the special information is a $P_T$ or $Q_T$ message as yet undefined in the DECT standard.

4. Method according to claim 2 characterized in that the special information is the "portable part" synchronization word of the synchronization field defined in the DECT standard.

5. Method according to claim 2 characterized in that the special information is another synchronization word of the synchronization field, in addition to the "portable part" synchronization word and the "radio fixed part" synchronization word for hybrid mobile components, as yet undefined in the DECT standard.

* * * * *